May 17, 1949.  J. W. MILLER ET AL  2,470,572
FUEL FEED CONTROL
Filed Dec. 29, 1945
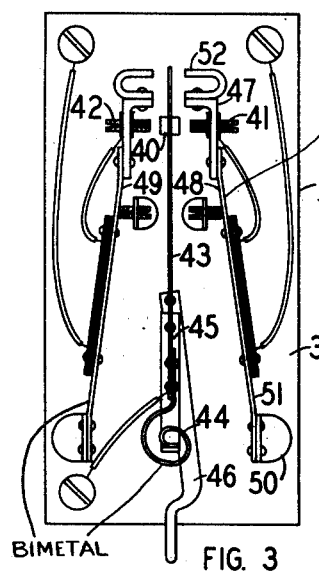
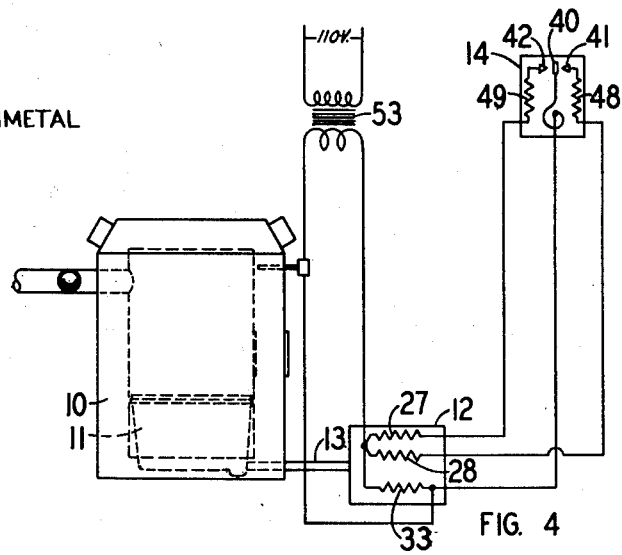
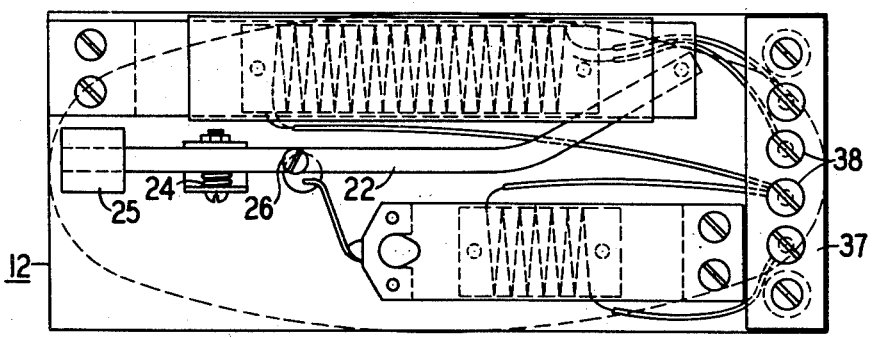
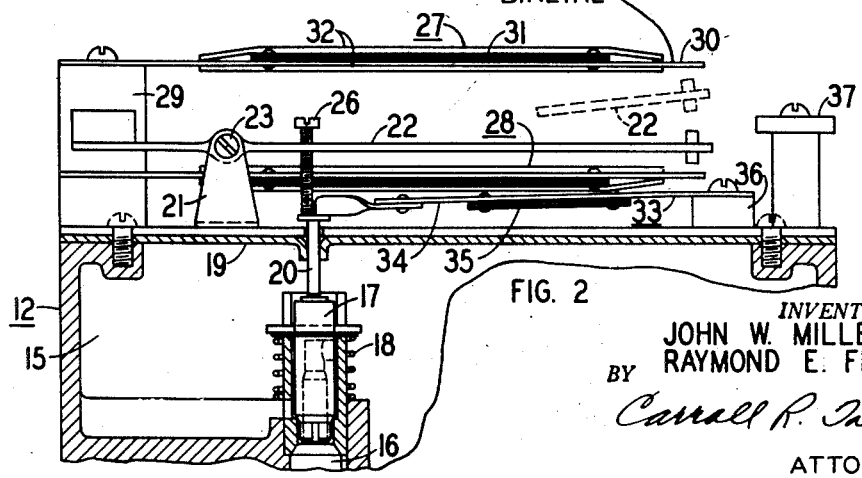
INVENTOR.
JOHN W. MILLER
RAYMOND E. FELL
BY Carroll R. Taber
ATTORNEY Patented May 17, 1949

2,470,572

UNITED STATES PATENT OFFICE 2,470,572

FUEL FEED CONTROL

John W. Miller and Raymond E. Fell, Lansing, Mich., assignors to Motor Wheel Corporation, Lansing, Mich., a corporation of Michigan Application December 29, 1945, Serial No. 638,153

4 Claims. (Cl. 236—68)

This invention relates to automatic fuel feed controls for liquid fuel burners.

The principal object of the present invention is to provide a simple and accurate fully modulated fuel metering valve for liquid fuel burners.

Another object is to provide a fuel feed control system which will regulate the fuel flow, and consequent supply of heat, to balance the heat loss from the building to be heated.

A still further object is to provide a sensitive thermostat for use in connection with such a fuel metering valve.

These objects will more fully appear in the following specification when read in connection with the accompanying drawings, wherein:

Figure 1 is a plan view of a fuel metering device embodying the invention;

Figure 2 is a fragmentary cross-sectional view of the same;

Figure 3 is a front elevational view of the thermostat for controlling the operation of the fuel metering device; and Figure 4 is a wiring diagram of the complete control system.

The fuel control is adapted to regulate the amount of heat furnished to a building from a conventional oil burning heater 10. (See Figure 4). The heater includes a liquid fuel burner of the vaporizing type 11 to which fuel is fed from a source (not shown) through a fuel metering valve 12 and fuel conduit 13. The metering valve is shown in detail in Figures 1 and 2 and diagrammatically only in Figure 4. The fuel metering valve is controlled by a thermostat 14.

The fuel metering valve comprises a housing having a fuel chamber 15 therein in which liquid fuel is maintained at constant level by suitable means such as a float valve or barometric tank (not shown). An outlet 16 to conduit 13 is provided with a valve seat and a vertically reciprocable metering valve 17. The latter is urged upwardly by spring 18.

The top of the housing consists of a cover plate 19 having an opening therein directly above the valve 17 in which an actuating pin 20 reciprocates.

A U-shaped bracket 21, mounted on the cover plate, carries a lever 22 which is pivoted thereon by pivot screw 23. A coil spring 24 biases the lever 22 against one leg of the bracket 21 to hold the lever in adjusted position by friction. One end of the lever 22 is much longer than the other. The shorter end carries a counter-balancing weight 25. An adjusting screw 26 is threaded through the lever 22 and contacts the upper end of pin 20.

A pair of heat motors 27 and 28 are mounted on a support 29 secured to the cover plate 19. Each motor consists of a warpable bimetallic strip 30 to which is attached an electrical heating coil 31. The strip 30 and coil 31 are insulated by suitable heat insulation 32 wrapped around the coil and the major portion of the bimetallic strip. One end of each strip 30 of the heat motors 27 and 28 is attached rigidly to support 29, while the other and free end overlies the longer end of lever 22. Motor 27 warps downwardly and motor 28 warps upwardly when heated.

A third heat motor 33, consisting of a warpable bimetallic strip 34 and heating coil 35, is attached to a support 36. The coil 35 is not insulated. The free end of motor 33 carries an arm bent to overlie the head of pin 20. Motor 33 warps upwardly when heated.

A terminal block 37 of electrical insulation is mounted on the cover plate and carries binding posts 38 for attachment of the electrical leads thereto.

Thermostat 14 comprises a base 39 which carries three movable electrical contact elements 40, 41 and 42. Contact 40 is mounted on a bar 43 of magnetic material attached to a bimetallic member 44. The latter is mounted on a support 45 pivoted on base 39 and adapted to be moved by adjusting lever 46. The bimetallic member 44 warps under the influence of ambient temperature and thus moves contact 40 to right or left.

Contacts 41 and 42 are screws threaded into brackets 47 attached to the free ends of bimetallic strips 48 and 49. The other ends of strips 48 and 49 are secured to brackets 50 on base 39. A heating coil 51 is attached to each strip 48 and 49 but is not heat insulated. A small permanent magnet 52 is mounted on each bracket 47. The bimetallic strips 48 are arranged so that when heated they move in directions away from each other, and when cooling they move toward each other.

The thermostat and fuel metering valve motors are electrically connected as clearly evident in Figure 4. The coil of heat motor 27 is connected in series with the coil on the strip 49 carrying contact 42. The coil of heat motor 28 is in series with the coil of the strip 48 carrying contact 41. Contact 40 is connected so as to be in series with one or the other of the coils when touching the respective contact 41 or 42.

A step-down transformer 53 connected to the usual household current supply furnishes power for the fuel control.

When the current is first turned on in the control system the coil 35 of heat motor 33 is energized. The coil 35 heats the strip 34 and causes it to bend upward away from the pin 20. This permits the fuel valve 17 to be pushed upward by spring 18 until pin 20 strikes screw 26 in the lever 22. Unless the lever 22 has been pushed down as far as it will go, fuel will then flow into the burner and can be ignited by any suitable means.

If the temperature of the room is that for which the thermostat is adjusted, nothing further will happen, as the contact 40 will not be touching either contact 41 or 42. However, if the room temperature drops, the bimetallic element 44 will warp to move contact 40 toward contact 41. As soon as the contact 40 moves far enough so that the magnetic attraction of the magnet on the bar 48 for the arm 43 is great enough, the arm 43 snaps to the right. Contacts 40 and 41 then close the circuit through the heating coils on the bar 48 and motor 28, causing them to heat. Motor 28 immediately starts to move upwardly and pushes against the under side of lever 22. The force of the motor 28 is great enough to overcome the frictional resistance of the spring 24 so that the lever 22 will move upward, permitting valve 17 to open and admit fuel to the burner. At the same time bar 48 is caused to bend toward the right, tending to move contact 41 away from contact 40. However, the magnet 52 pulls the arm 43 along with bar 48 for a short distance. The arm 43 is moved to the right until the bending stress in arm 43 is sufficient to pull the arm away from the magnet and break the circuit of the coils in the motors 28 and 48.

The bar 48 cools rapidly because it is not insulated, while motor 28, being insulated, cools slowly. Thus bar 48 quickly moves back toward contact 40 and reestablishes the circuit of the coil on the bar 48 and motor 28, before motor 28 has moved downwardly appreciably, if at all. While the bar 48 is again being heated, the motor 28 is heated further and moves the lever 22 to admit fuel to the burner at a still greater rate.

This continues intermittently until such time as the room thermostat no longer calls for heat. The arm 43 is then in its central position and remains there until the room temperature changes.

Should the burner pour out heat at too rapid a rate, as may be the case when the burner is started from cold, the arm 43 moves to the left and makes the circuit of the coil on bar 49 and motor 27. The motor 27 then bends downwardly. It soon contacts the lever 22 and pushes the lever down, thereby partially closing the metering valve.

In the meantime the coil on the bar 49, which is now in circuit with the motor 27, heats the bar 49 causing it to bend to the left and break the circuit. The bar 49 cools rapidly so that it bends to the right and reestablishes the circuit of the motor 27 and the coil on the bar 49. The motor 27, which has remained warm, pushes lever 22 down slightly and partially closes the valve.

Eventually a relatively stable condition will be reached where the heat generated by the burner balances the heat loss from the building. No further movement of the fuel valve will occur unless a temperature change outside of the building necessitates a change in heat output from the burner. When such a change does occur the fuel control system quickly makes the necessary adjustment of the valve to compensate for the change in heating requirements.

It will be noted that the heating coils on the bars 48 and 49 are effective as anticipating means so as to control the ambient temperature very closely. By employing two bars 48 and 49 and two heating coils, the thermostat will anticipate ambient temperature changes when the heating system is raising the ambient temperature as well as when lowering it.

If the electric current in the control system should be interrupted for any reason, the motor 33 cools and closes the valve 17, shutting off the fuel supply. The valve will not reopen until current is again available.

When the current fails, or is shut off, and motor 33 closes the valve 17, the lever 22 follows the pin 20 downward and keeps the latter in contact with valve 17. This occurs because the weight of the long end of the lever 22 is not completely counterbalanced. Spring 18 is also required to hold the lever 22 in adjusted position. Thus, whenever the current is shut off, and the valve closed to pilot position by motor 33, lever 22 holds the valve in this position until the lever is lifted by motor 28. When the current supply is reestablished the motor 28 must be actuated before the valve can open. There is no possibility of the burner overheating the building when the current supply for the control system fails.

From the foregoing it will be seen that the present invention provides a simple and effective control for a liquid fuel burning system. The control is fully modulated and provides accurate regulation of fuel over a wide range.

The scope of the invention is indicated in the appended claims.

We claim:

1. A fuel feed control comprising a reciprocable metering valve, spring means biasing said valve to open the latter, a lever contacting said valve and adapted when moved in one direction to move said valve toward closed position, frictional holding means acting on said lever for holding the latter in adjusted position, a pair of heat motors associated with said lever and adapted when heated to move the lever in opposite directions, said heat motors comprising warpable bars and electrical heating coils in heat exchange relation therewith, a thermostat comprising a pair of spaced warpable bars which move in opposite directions when heated, heating coils in heat exchange relation with said last named pair of warpable bars, means connecting each of said second named heating coils in series with said first named heating coils respectively, and a warpable blade located between said second named warpable bars and adapted to move into contact with one of said thermostat arms above a given temperature and with the other of said thermostat arms below said given temperature, and electrical conductors connecting said blade in circuit with one of each pair of heating coils when said blade is in contact with one of the bars of said thermostat.

2. A fuel feed control comprising an adjustable fuel metering valve and mechanism associated with said valve for adjusting the latter between opened and closed positions, said mechanism comprising an electrically energized motor, a circuit therefor including a thermostatic switch, said switch comprising a pair of warpable arms, one of said arms being adapted when heated to bend away from the other arm, said one arm having a heating coil in heat exchange relation with said arm, said coil being connected into said circuit and adapted when energized to heat said arm, and a lever mounted on a friction hinge and actuatable by said motor, said lever being connected to said valve for maintaining the position of adjustment of said valve determined by said mechanism.

3. A fuel feed control as defined in claim 2 wherein said motor comprises a warpable bimetallic bar, a heating coil in heat exchange relation therewith, and heat insulating means partially enclosing said bar and said coil.

4. A fuel feed control comprising a reciprocable metering valve, spring means biasing said valve to open the latter, a member contacting said valve and adapted when moved in one direction to move said valve toward closed position, mechanism acting on said member for holding the latter in adjusted position, a pair of heat motors associated with said member and adapted when heated to move the member in opposite directions, said heat motors comprising warpable bars and electrical heating coils in heat exchange relation therewith, a flasher-type thermostat comprising a pair of spaced warpable bars which move in opposite directions when heated, heating coils in heat exchange relation with said last named pair of warpable bars, means connecting each of said second named heating coils in series with said first named heating coils respectively, and a temperature responsive warpable blade located between said second named warpable bars and adapted to move into contact with one of said thermostat warpable bars above a given temperature and with the other of said thermostat warpable bars below said given temperature, and electrical conductors connecting said blade in circuit with one of each pair of heating coils when said blade is in contact with one of the bars of said thermostat.

JOHN W. MILLER.
RAYMOND E. FELL.

REFERENCES CITED

The following references are of record in the file of this patent:

UNITED STATES PATENTS

| Number | Name | Date |
|---|---|---|
| 1,886,439 | Wells | Nov. 8, 1932 |
| 2,052,536 | Shivers | Aug. 25, 1936 |
| 2,285,913 | Derrah | June 9, 1942 |
| 2,329,820 | Breese | Sept. 21, 1943 |

FOREIGN PATENTS

| Number | Country | Date |
|---|---|---|
| 541,830 | Great Britain | Dec. 12, 1941 |
| 850,758 | France | Sept. 18, 1939 |